United States Patent Office 3,414,733
Patented Dec. 3, 1968

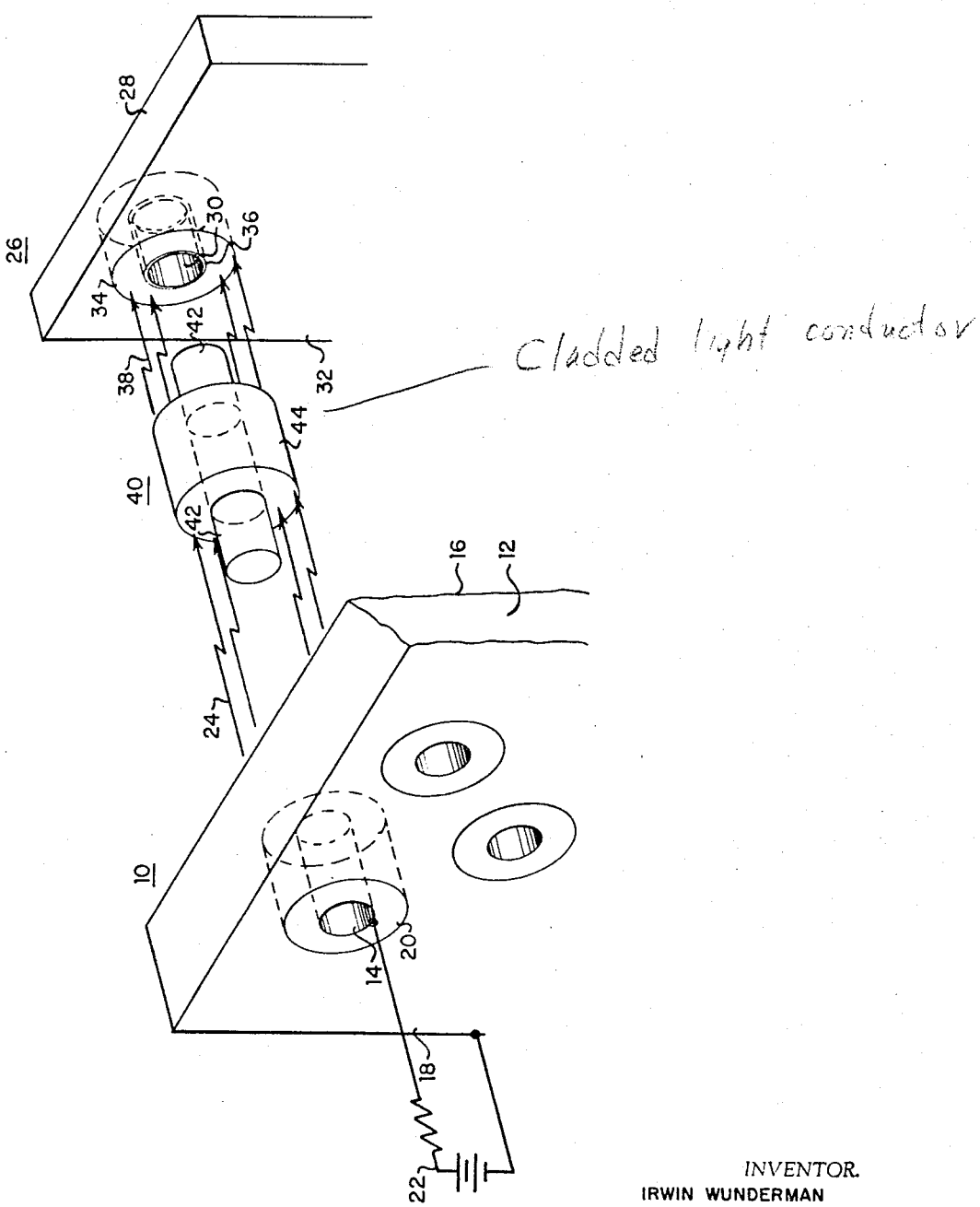

3,414,733
ANNULARLY SHAPED LIGHT EMITTER AND PHOTOCELL CONNECTED BY PLUG-IN LIGHT CONDUCTING PAD
Irwin Wunderman, Mountain View, Calif., assignor to Hewlett-Packard Company, Palo Alto, Calif., a corporation of California
Filed Feb. 15, 1965, Ser. No. 432,767
9 Claims. (Cl. 250—227)

This invention relates to an optoelectronic device. Optoelectronic devices emit, modulate, or sense radiation at or near optical frequenceis such as light.

It is the principal object of this invention to provide an optoelectronic device wherein information is efficiently coupled out of an array of semiconductor light sources and into an array of semiconductor photodetectors.

Other and incidental objects of this invention will be apparent from a reading of this specification and an inspection of the accompanying drawing which is an exploded schematic view of an optoelectronic device comprising a plurality of photon coupled pairs of light sources and detectors according to this invention.

Referring now to the drawing, there is shown an array of semiconductor light sources 10 comprising a substrate 12 of semiconductor injection electroluminescent material of one conductivity type. For example, substrate 12 may comprise N type gallium arsenide material. This substrate 12 forms a Fabry Perot structure with parallel surfaces which may be fabricated by lapping and polishing or cleaving. Cylindrical cavities 14 extend through the substrate 12 normal to the parallel front and back surfaces 16 and 18 thereof. An annular layer 20 of semiconductor material of different conductivity type from that of substrate 12, in this case P type material, is diffused into the wall of each cavity 14. Each annular layer 20 forms a continuous P-N junction with the substrate 12 to provide a separate diode laser light source. When biased in the forward direction as indicated at 22, each diode laser light source emits P-N junction luminescence radiation. These diode laser light sources have an inherently directional output such that light radiates in a direction substantially normal to the ends of the annular layers 20 as indicated at 24. The back surface 18 of substrate 12 may optionally be made reflective so as to direct all of the light out the front end of the diode lasers. Thus, the entire structure permits light source outputs radiating light normal to the surface of a plane at arbitrary positions across the surface of the plane. This configuration of the array of light sources 10 permits great freedom in the selection of laser length, junction area, and junction depth to fulfill the requirements of different applications.

The array of semiconductor photodetectors 26 comprises a compensatable N type semiconductor substrate 28 which is a mirror image of substrate 12 of the array of semiconductor light sources 10. Thus, substrate 26 includes cylindrical cavities 30 which extend normally therethrough with reference to the front surface 32. An annular layer 34 of compensating material is diffused into substrate 28 to form an I, or intrinsic, region and thus a continuous I-N interface. A thin annular layer 36 of P type semiconductor material is diffused into the wall of each cavity 30 thereby forming a continuous P-I-N junction. This provides an array of P-I-N diode photodetectors in which impinging light enters directly into the active ends of the annular layers 34 of intrinsic semiconductor material, as indicated at 38. Thus, the photon losses normally occurring in conventional devices where impinging light must first pass through a thin layer of P type semiconductor material covering the layer of intrinsic material are eliminated. In addition this configuration of the array of semiconductor photo detectors 26 permits greater design freedom in the selection of P-I-N diode capacitance, thickness or transit time, active surface area, penetration depth, and penetration volume. With this configuration it may be possible to achieve a wide spectral bandwidth reaching far into the ultraviolet and infrared region since the surface photogenerated electron-hole pairs constitute photocurrent.

The array of semiconductor light sources 10 and the array of semiconductor photodetectors 26 are coupled together by a plurality of light pipes 40 (only one is shown). Each light pipe 40 comprises a cylindrical low index of refraction supporting core 42 which is fitted into corresponding cylindrical cavities 14 and 30. A high index of refraction layer 44 is then deposited on the supporting core 42 while it is in place to provide good optical contact with the light source and photodetector and to minimize the discontinuity at the interfaces. The thickness of the high index of refraction layer 44 is substantially the same as that of the annular layer 20 of P material and the annular layer 34 of intrinsic material. Photons from the output of the light source propagate through the high index of refraction layer 44, which serves as a dielectric waveguide, to the photodetector without significant loss in power density. Even if the back surface 18 of substrate 12 is not made reflective, but is merely oxidized or exposed to air, most of the generated radiation will enter the high index of refraction layer 44 and reach the photodetector because of the lower dielectric discontinuity at the light pipe end.

This optoelectronic device provides a rigid structure in which the array of semiconductor light sources 10 is physically coupled to the array of semiconductor photoconductors 26, thereby minimizing microphonics and placement errors in manufacturing. The coaxial symmetry of the device provides greater bandwidth potential. An optoelectronic device such as this may be used in many applications including optical connectors, photon coupled logic elements, or mass photosensors. In some of these applications it may be desirable to integrate additional circuits into other portions of the substrates 12 and 28. This may readily be done since isolation techniques, such as beam leaded structures, can be used to electrically isolate all the diodes on each substrate.

Though the array of semiconductor light sources 10 and the array of semiconductor photodectors 26 are disclosed as parts of one optoelectronic device, each could be used separately in many applications. Furthermore, the geometry of the light sources and photodetectors might be square or some other configuration as well as circular. In addition the continuous annular junctions of the semiconductor light sources and photodetectors might be equally well replaced by non-continuous isolated junction segments which needn't extend clear through the substrate.

I claim:
1. A radiation coupled semiconductor device comprising:
   a first substrate portion including first and second semiconductor regions of opposite conductivity type;
   a first junction between said first and second semiconductor regions of opposite conductivity type, said first junction having a radiating end and being operable for producing radiation from the radiating end of a plane tangent to the first junction;
   means for biasing the first junction to produce said radiation;
   a second substrate portion including third and fourth semiconductor regions of opposite conductivity type;
   a second junction between said third and fourth semiconductor regions of opposite conductivity type, said second junction being spaced from the first junction and having a receiving end for receiving radiation; and coupling means forming a path that is more highly refractive than the surrounding medium, said path being in contiguity when the radiating end of the first junction and the receiving end of the second junction and being arranged for coupling radiation from the radiating end to the receiving end.

2. A radiation coupled semiconductor device as in claim 1 wherein:

said second juncture includes a region of intrinsic material; and said path is substantially coextensive with the region of intrinsic material at the receiving end of the second junction so as to couple radiation from the radiating end of the first junction to the receiving end of the second junction.

3. A radiation coupled semiconductor device comprising:

a first substrate of semiconductor material including first and second regions of opposite conductivity type and a first junction between these first and second regions, said first junction having a radiating end and being operable for producing radiation from the radiating end in a plane tangent to the first junction;

means for biasing the first junction to produce said radiation;

a second substrate of semiconductor material including first and second regions of opposite conductivity type and a second junction between these first and second regions, said second junction having a receiving end for receiving radiation; and coupling means forming a coupling path that is more highly refractive than the surrounding medium, said coupling path being in contiguity with the radiating end of the first junction and the receiving end of the second junction and being arranged for coupling radiation from the radiating end to the receiving end.

4. A radiation coupled semiconductor device as in claim 3 wherein:

said first substrate includes a first surface and a first cavity opening through the first surface and extending along a line intersecting the first surface, said first and second regions of the first substrate being disposed around the first cavity and forming a continuous junction coaxial with the first cavity and intersecting the first surface;

said second substrate includes a second surface and a second cavity opening through the second surface and extending along a line intersecting the second surface, said first and second regions of the second substrate being disposed around the second cavity and forming a continuous junction coaxial with the second cavity and intersecting the second surface; and said coupling means includes an inner member having one end fitted into the first cavity and another end fitted into the second cavity so as to support the inner member between the first surface of the first substrate and the second surface of the second substrate, said inner member coaxially supporting a more highly refractive outerlayer that forms the coupling path.

5. A radiation coupled semiconductor device as in claim 4 wherein:

said second junction includes a region of intrinsic material; and said coupling path is substantially coextensive with the region of intrinsic material at the receiving end of the second junction so as to couple radiation from the radiating end of the first junction to the receiving end of the second junction.

6. A semiconductor radiation source comprising:

a substrate of semiconductor material having a surface, a cavity that opens through the surface and that is disposed along a line intersecting the surface, the first and second regions of opposite conductivity type that form a continuous junction around the cavity, said junction being operable for producing radiation from the surface in a plane tangent to the junction; and bias means for biasing the junction to produce said radiation.

7. A semiconductor radiation source comprising:

a substrate of semiconductor material having first and second regions of opposite conductivity type and a junction between these first and second regions, said junction having a radiating end and being operable for producing radiation from the radiating end in a plane tangent to the junction;

means for biasing the junction to produce said radiation; and output coupling means forming a path that is more highly refractive than the surrounding medium, said path being in contiguity with the radiating end of the juction and being arranged for transmitting radiation away from the junction, whereby radiation may be coupled from the junction to a utilization device.

8. A semiconductor radiation detector comprising a substrate of semiconductor material having a surface, a cavity that opens through the surface and that is disposed along a line intersecting the surface, and first and second regions of opposite conductivity type that form a continuous junction around the cavity, said junction having a receiving end at the surface of the substrate for receiving radiation.

9. A semiconductor radiation detector as in claim 8 wherein said junction includes a region of intrinsic material for receiving radiation.

References Cited

UNITED STATES PATENTS

| 2,898,468 | 8/1959 | McNaney | 250—227 |
|---|---|---|---|
| 2,986,591 | 5/1961 | Swanson et al. | 250—211 |
| 3,130,317 | 4/1964 | Connelly et al. | |
| 3,135,866 | 6/1964 | McNaney. | |
| 3,229,104 | 1/1966 | Rutz | 250—227 |

RALPH G. NILSON, *Primary Examiner.*

MARTIN ABRAMSON, *Assistant Examiner.*